United States Patent [19]
Irven

[11] 4,242,118
[45] Dec. 30, 1980

[54] OPTICAL FIBER MANUFACTURE
[75] Inventor: John Irven, Stansted, England
[73] Assignee: International Standard Electric Corporation, New York, N.Y.
[21] Appl. No.: 33,914
[22] Filed: Apr. 27, 1979
[51] Int. Cl.³ .............................................. C03C 25/02
[52] U.S. Cl. ........................................ 65/3 A; 65/2; 65/13; 65/18; 350/96.31
[58] Field of Search ................ 65/2, 3 A, 18, 13; 350/96.51

[56] References Cited
U.S. PATENT DOCUMENTS

| | | | |
|---|---|---|---|
| 4,062,665 | 12/1977 | Izawa et al. ........................... | 65/3 A |
| 4,135,901 | 1/1979 | Fujiwara et al. ........................ | 65/2 |
| 4,140,505 | 2/1979 | Ramsay et al. .......................... | 65/2 |

*Primary Examiner*—Robert L. Lindsay, Jr.
*Attorney, Agent, or Firm*—John T. O'Halloran; Peter C. Van Der Sluys; Thomas N. Twomey

[57] ABSTRACT

A method for making an optical fiber solid rod preform wherein a vapor reaction deposit process is used to form a localized deposit on an end face of a rod or disc by relative movement in which the position of the localized deposit is scanned over the end face of the solid rod or disc and at the same time the reaction is progressively changed to cause the deposit building up on the end face to have a radially graded refractive index profile.

16 Claims, 4 Drawing Figures

1

OPTICAL FIBER MANUFACTURE

BACKGROUND OF THE INVENTION

This invention relates to optical fiber and optical fiber preform manufacture by a vapor reaction deposition process.

SUMMARY OF THE INVENTION

According to this invention there is provided a method of optical fiber solid rod preform manufacture wherein a vapor reaction deposition process is used to form a localized deposit upon the end face of a rod or disc and wherein, by means of relative movement, the position of the localized deposit is scanned over the end face of said rod or disc and at the same time the reaction is progressively changed so as to cause the deposit building up on the end face to have a radially graded refractive index profile.

BRIEF DESCRIPTION OF THE DRAWINGS

There follows a description of the manufacture of optical fiber preforms and optical fibers by methods embodying this invention in preferred forms. The description refers to the accompanying drawings in which.

DETAILED DESCRIPTION OF THE INVENTION

For the purpose of this specification, the term vapor reaction deposition process is to be understood as including, inter alia, deposition by the flame hydrolysis and by the radio frequency excited plasma flame process.

Figure 1:
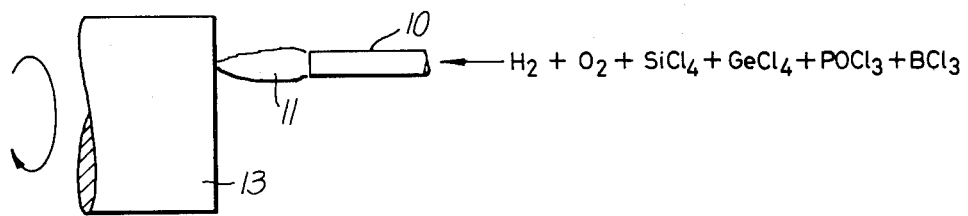
FIGS. 1, 2 and 3 depict schematic diagrams illustrating three methods of manufacturing optical fiber preform.

The first method of optical fiber preform manufacture to be described involves deposition by flame hydrolysis. Referring to FIG. 1, a burner 10 is provided with a hydrogen supply and an oxygen supply. The oxygen supply is passed through vapor entrainment means (not shown) which enables a part of the gas flow to be passed through a selection of different liquids to entrain their vapors for transport to the burner. Typically these liquids include silicon tetrachloride to react in the flame to produce silica, and germanium tetrachloride, phosphorus oxychloride, and boron chloride to react in the flame so as to produce oxides that dope the silica and thus modify its refractive index. With different entrainment apparatus hydrides may be substituted for one or more of the halides. The flame 11 issuing from the burner is directed against a substrate rod (or disc) 13 upon the face of which the deposit of the flame hydrolysis collects. The rod 13 is rotated about its axis and at the same time the burner is scanned from side to side of the end face of the rod along a line that passes through its axis. In this way it is arranged that the deposit builds up over the whole face. It will be appreciated that if the deposition rate were constant, and the scan was in a straight line and at uniform speed the deposit would build up at a faster rate towards the center. This is undesirable and in order to achieve a uniform deposit at least one of these three parameters must be modfied. A feature of this invention is the modification of the flame hydrolysis reaction is synchronism with the scan in order to vary the reaction product in order to provide a graded index profile. This is achieved by varying the relative proportions of the gas flows through the individual liquids providing the vapor reagents for forming the deposit. Thus in the portion of a scan proceeding from the center towards the periphery the relative proportions of the precursors of the index increasing dopants, such as germania and phosphorus pentoxide, are progressively reduced. It is therefore generally found convenient to superimpose the cyclic changes of flow rates necessary to achieve a uniform coverage of the end face of the rod 13 upon the cyclic changes of flow rates necessary to achieve the required index grading. According to a preferred construction of preform the index grading does not extend to the extreme periphery but instead there is grown a surface region of substantially constant refractive index from within which the refractive index increases smoothly in an approximately parabolic manner to a maximum value at the center.

The rod 13 is slowly withdrawn from the burner 10 at a rate matching the build up of the deposit on its end face so as to maintain constant the distance between the burner and the surface upon which the flame 11 impinges.

It would be preferable to arrange the deposition conditions so that the deposit vitrifies as it is deposited (hereinafter referred to as direct vitrification), rather than to collect the deposit in a non-vitreous particulate form requiring subsequent vitrification. It is found, however, that with this particular deposition method this is not possible when it is desired to incorporate volatile dopant oxides such as germania, phosphorus pentoxide or boric oxide into the deposit. The volatility of these dopants is so great that with this deposition method it is not possible to leave a significant proportion of these dopants in the deposit. To make a preform doped with these dopants the deposit is first collected at a temperature in which it forms a dense particulate deposit, and then the deposit is subsequently sintered at a higher temperature just high enough to vitrify it.

The subsequent vitrification of the particulate deposit may be performed by causing the rod 13 and the deposit on its end face to be withdrawn from the burner through a furnace (not shown). It is of course not necessary for the vitrification to be performed concurrently with the deposition and, if desired, the vitrification may be performed as an entirely separate independent subsequent process step. Alternatively, a cyclic operation may be employed in which, when a predetermined thickness of particulate deposit has been accumulated, the supply of vapors to the burner may be temporarily halted and the flame adjusted to raise its temperature sufficiently to enable it to vitrify the accumulated deposit before restarting the deposition process.

Figure 2:
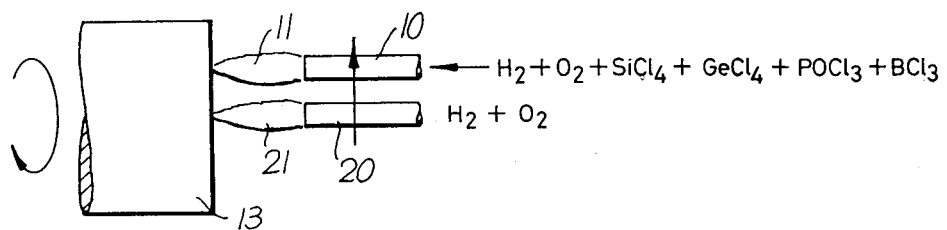

A further alternative method of vitrifying a deposit which it is impractical to collect by direct vitrification involves a form of concurrent deposition and vitrification in which the deposit is formed as a particulate deposit in a localized zone traversed across the end face of the rod (or the material that has accumulated on that end face), while the particulate material thereby deposited is vitrified in a second localized zone also traversed over the end face (or the material that has accumulated thereon). One possible arrangement for performing this operation is depicted in FIG. 2. This differs from the arrangement of FIG. 1 only in the provision of a second burner 20 that is scanned with the first. This second burner is just supplied with hydrogen and oxygen without any of the additional vapors, and is adjusted to provide a hot enough flame 21 to melt the deposit previously left by the passage of burner 10 and its flame 11. For this purpose the scanning is arranged so that flame 21 follows in the path of flame 11. At the end of each traverse the relative position of the two burners is reversed ready for the traverse back in the opposite direction.

In a further modification which is not illustrated the second burner surrounds the first in a concentric arrangement.

Figure 3:
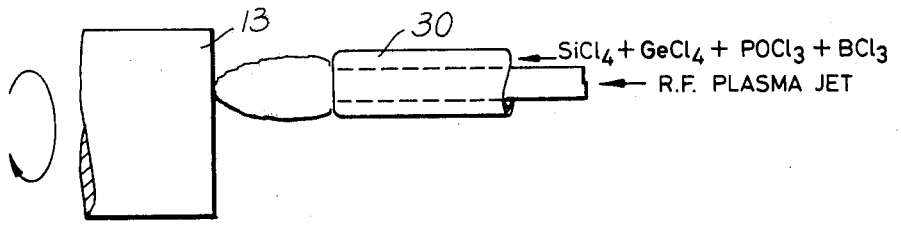

In the foregoing description deposition by flame hydrolysis has been exemplified. An alternative deposition process that can be used is radio frequency excited plasma flame deposition. A feature of the flame hydrolysis is that, since hydrogen and oxygen are both present in the reaction, the resulting product is liable to be contaminated with OH groups which give rise to attenuation bands that may extend into the region of the spectrum for which the fiber has been designed. With a plasma flame deposition process it is possible to choose a reaction from which hydrogen and hydrogen containing compounds have been excluded so as to preclude the formation of OH groups which might otherwise become incorporated into the deposit. FIG. 3 depicts an arrangement using a radio frequency excited plasma torch. This differs from the arrangement of FIG. 1 only in the replacement of the flame hydrolysis burner with a plasma torch 30. This torch has a concentric arrangement in which a radio frequency (typically in the range 3 to 27 MHz) excited oxygen plasma jet issues from the inner duct while materials in vapor form to form the deposit are directed into the plasma flame from the surrounding annular duct. These materials are converted into oxides by the oxygen of the plasma or by oxygen gas in which the vapors are entrained. Conveniently these vapors may be the same halides and oxyhalides employed in the arrangement previously described with reference to FIG. 1. In this instance, however, the resulting reaction is a direct oxidation reaction instead of a hydrolysis reaction. Sufficient energy can be provided by the plasma flame to promote vitrification directly opposite the burner of material deposited in non-vitreous form nearer the periphery of the flame. There is therefore no necessity to make special provision for a separate subsequent vitrification step when depositing material incorporating one or more volatile dopants such as germania.

Figure 4:
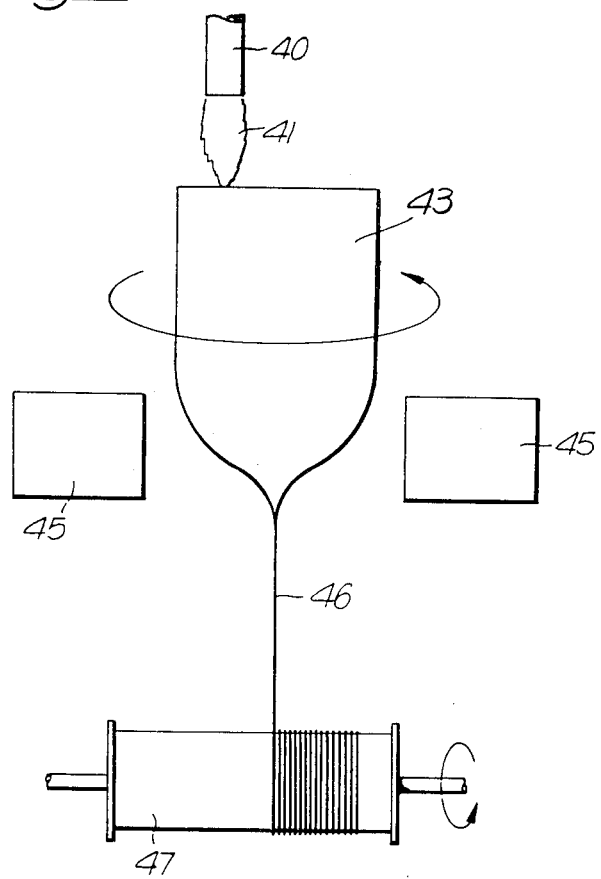
FIG. 4 depicts a schematic diagram illustrating how the methods of FIGS. 1, 2 and 3 can be used to produce optical fiber on a continuous basis.

It is to be noted that each of the above described arrangements can be operated to produce optical fiber on a continuous basis. This is depicted in FIG. 4. A flame hydrolysis burner or plasma torch 40 is scanned across the end of an optical fiber preform 43 so that the deposit produced by its flame 41 replenishes the material of the preform. The preform is rotated about its axis and withdrawn from the burner or torch 40 by means (not shown) which is adjusted to withdraw the preform at a rate matching that at which it builds up so that a constant distance is maintained between the burner or torch 40 and the end of the preform 43. This same feed means feeds the preform into a drawing furnace 45 where the tip of the preform is raised to a temperature at which it can be drawn into fiber 46. The resulting fiber is collected on a take-up drum 47. Normally the fiber will be passed through a coating bath (not shown) prior to being wound on the drum in order to provide a coating for the freshly drawn fiber so as to protect its surface from degradation by atmospheric attack. Although the preform is being continuously rotated about its axis while it is being drawn into fiber, it has been found unnecessary to rotate the drawn fiber in synchronism with the preform because continuous shear can be tolerated at the point of drawing.

It is believed that the deposition reactions described above are at least predominately homogeneous vapor phase reactions involving the nucleation of a mixed oxide, with its subsequent deposition in particulate form followed by sintering or deposition and simultaneous fusion to a glassy state. A further alternative deposition method can be employed which involves a heterogeneous surface phase nucleation mechanism in which glass is grown directly on the substrate surface. Typically a heterogeneous phase reaction can proceed at a lower substrate temperature than that required for forming a glassy deposit by an equivalent homogeneous phase reaction. The plasma flame deposition reaction previously described with reference to FIG. 3 is believed to be predominately a homogeneous phase reaction under normal operating conditions and flow rates, but, by modifying the apparatus so that the torch, substrate and scanning assembly operate in a reduced pressure environment instead of at atmospheric pressure, a heterogeneous phase reaction can be promoted in which the deposit is formed directly as a glass. Such a reaction is produced for instance by operation at a pressure in the region of 1-50 torr with a 27 MHz inductive or 'H' plasma of several kilowatts power level. The inductive plasma may alternatively be replaced with a higher frequency microwave plasma, such as one operating at 2.45 GHz leaving the pressure and power level requirements substantially unchanged.

Heterogeneous surface nucleation can be promoted at atmospheric pressure by thermally activated reaction, albeit at relatively slow deposition rates, it is therefore believed that operation at reduced pressure is not a necessary condition for obtaining plasma activated heterogeneous surface nucleation, provided that the flow rate, reactant concentration, ionic and electron temperatures of the plasma discharge are chosen to provide a low concentration of activated reagent species in the plasma.

While I have described above the principles of my invention in connection with specific apparatus it is to be clearly understood that this description is made only by way of example and not as a limitation to the scope of my invention as set forth in the objects thereof and in the accompanying claims.

What is claimed is:

1. A method of manufacturing an optical fiber solid rod preform comprising the steps of:
    forming a localized deposit upon the end face of a rod by a vapor reaction deposition process;
    scanning the position of the localized deposit over the end face of said rod by means of relative movement; and
    progressively changing the reaction at the same time so as to cause the deposit building up on the end face to have a radially graded refractive index profile.

2. The method as claimed in claim 1, wherein the rod is rotated about its axis during the deposition.

3. The method as claimed in claim 1, wherein the rod is withdrawn axially at a rate matching the growth rate of material upon its end face.

4. The method as claimed in claim 1, 2 or 3 wherein the deposit is formed by flame hydrolysis.

5. The method as claimed in claim 1 wherein the deposit is formed by a reaction from which hydrogen or hydrogen containing compounds are excluded.

6. The method as claimed in claim 1 wherein the deposit is formed by a plasma flame reaction.

7. The method as claimed in claim 1, 2, 3, 5 or 6 wherein the deposit is initially formed in a non-vitreous form which is later vitrified.

8. The method as claimed in claim 1, 2, 3, 5 or 6 wherein vitrifications is performed concurrently with the deposition.

9. The method as claimed in claim 1, 2, 3, 5 or 6 wherein the deposit is formed in non-vitreous form by first means scanned over said end face and wherein a second means scanned with said first means is employed to vitrify the deposit left by the scanning of said first means.

10. The method as claimed in claim 1, 2, 3 or 5 wherein the deposit is formed by a plasma flame reaction operated under conditions which cause the deposit to be formed by a heterogeneous surface nucleation reaction.

11. The method as claimed in claim 10 wherein the plasma flame reaction is operated at a pressure within range 1 to 50 torr.

12. The method as claimed in claim 1, 2, 3, 5 or 6 wherein silica is deposited doped with one or more oxides of germanium, phosphorus and boron.

13. A method of making an optical fiber wherein an optical fiber perform is made by the method claimed in claim 1, 2, 3, 5 or 6 comprising the step of:
    drawing concurrently with its manufacture said preform into fiber.

14. An optical fiber preform made by the method claimed in claim 1, 2, 3, 5 or 6.

15. An optical fiber made by the method claimed in claim 1, 2, 3, 5 or 6 comprising the step of:
    drawing concurrently with its manufacture said preform into fibre.

16. An optical fiber made from a preform made by the method claimed in claim 1, 2, 3, 5 or 6.

* * * * *